(12) United States Patent
Schiavon et al.

(10) Patent No.: US 9,688,330 B2
(45) Date of Patent: Jun. 27, 2017

(54) BICYCLE SADDLE

(71) Applicant: SELLE SMP S.A.S. DI MAURIZIO SCHIAVON, Casalserugo (PD) (IT)

(72) Inventors: Franco Schiavon, Padua (IT); Maurizio Schiavon, Padua (IT); Francesco Riondato, Bassano del Grappa (IT)

(73) Assignee: SELLE SMP S.A.S. di Maurizio Schiavon, Casalserugo (PD) (IT)

( * ) Notice: Subject to any disclaimer, the term of this patent is extended or adjusted under 35 U.S.C. 154(b) by 0 days.

(21) Appl. No.: 14/904,794

(22) PCT Filed: Jul. 10, 2014

(86) PCT No.: PCT/EP2014/064874
§ 371 (c)(1),
(2) Date: Jan. 13, 2016

(87) PCT Pub. No.: WO2015/007622
PCT Pub. Date: Jan. 22, 2015

(65) Prior Publication Data
US 2016/0137245 A1 May 19, 2016

(30) Foreign Application Priority Data
Jul. 18, 2013 (IT) .................. VI2013A0182

(51) Int. Cl.
B62J 1/00 (2006.01)
(52) U.S. Cl.
CPC .............. B62J 1/007 (2013.01); B62J 1/002 (2013.01)

(58) Field of Classification Search
CPC ..................... B62J 1/002; B62J 1/007
(Continued)

(56) References Cited

U.S. PATENT DOCUMENTS 7,537,281 B2 * 5/2009 Riondato ............ B62J 1/002
297/202
7,699,391 B2 * 4/2010 Riondato ............ B62J 1/007
297/202

(Continued)

FOREIGN PATENT DOCUMENTS

EP 1590229 A1 6/2008
EP 1778537 A 9/2008

(Continued)

OTHER PUBLICATIONS

International Search Report of PCT/EP2014/064874, mailed Sep. 30, 2014.

Primary Examiner — Anthony D Barfield
(74) Attorney, Agent, or Firm — Collard & Roe, P.C.

(57) ABSTRACT

There is provided a bicycle saddle, having two identical portions (30, 31) arranged symmetrically with respect to the longitudinal axis of the bicycle saddle. A channel (15), open from top to bottom, is provided along the longitudinal axis of the bicycle saddle. The front of the saddle is curved downwardly in an aquiline shape. The two identical portions (30, 31) from the rear ends thereof up to extensions (9, 10) that laterally delimit the central channel (15) are provided with substantially flat areas (1, 2) on which the gluteal muscles of the user are intended to be positioned during use of the saddle. The substantially flat areas (1, 2) are substantially parallel to the ground on which the wheels of the bicycle rest.

5 Claims, 7 Drawing Sheets

(58) Field of Classification Search
USPC .......................................................... 297/202
See application file for complete search history.

(56) References Cited

U.S. PATENT DOCUMENTS

| 9,296,438 B2* | 3/2016 | Riondato ................. B62J 1/002 |
| 2007/0210625 A1 | 9/2007 | Chen |

FOREIGN PATENT DOCUMENTS

| EP | 1781528 A1 | 8/2010 |
| EP | 2673183 A1 | 12/2013 |
| WO | 2006013063 A1 | 2/2006 |
| WO | 2006015731 A1 | 2/2006 |
| WO | 2012107215 A1 | 8/2012 |

\* cited by examiner

BICYCLE SADDLE of the invention having the TITLE "Bicycle saddle" to "Saddles SMP s.a.s. di Maurizio Schiavon".

CROSS REFERENCE TO RELATED APPLICATIONS

This application is the National Stage of PCT/EP2014/064874 filed on July 10, 2014, which claims priority under 35 U.S.C. §119 of Italian Application No. VI2013A000182 filed on July 18, 2013, the disclosures of which are incorporated herein by reference. The international application under PCT article 21(2) was published in English.

The present finding concerns a bicycle saddle, according to the general part of claim 1.

It is known that anybody who rides bicycles professionally or as an amateur faces substantial problems in using the saddle, particularly if they do so for many hours consecutively, like in the case of competitions or even just to carry out their recreational activities.

Indeed, sitting for many hours on a saddle, worsened by the bumps that the user inevitably receives in his perineal area due to the unevenness of the ground, results in a substantial vascular compression of the perineal structures, which can lead to a substantial reduction in sensitivity of the penis.

In order to avoid these drawbacks one of the inventors of the present finding has devised saddles that were the object of various patents, including documents EP 1590229 A and EP 1781528 A. In the introductory part of these patent documents numerous documents of the state of the art are quoted, just as some scientific studies concerning the reduction of blood flow in the penis due to prolonged use of a bicycle saddle are quoted.

Basically, the aforementioned two patents describe a bicycle saddle of the type that has two identical portions, separated for a long portion by a longitudinal channel that is open from the bottom to the top. In their rear part said saddles allow the optimal housing of the ischiatic tuberosities, while the user's penis has an optimal housing at the central and front part of the saddle, also thanks to the particular bird's beak configuration of the front end of the saddle itself.

All of this is well described and illustrated in the aforementioned documents.

Many tests and experiments carried out have made it possible to indisputably ascertain how good and effective the solutions described in such patent documents are and, in fact, the saddles described in them have had substantial commercial success in a great many countries. In particular, the saddles described in such documents have an inclined rear portion, precisely to allow optimal positioning of the user's ischiatic tuberosities. However, it should be considered that the users who use bicycles and therefore sit on their saddles do so in a great variety of ways and different situations; let us consider, for example, the enormous variety of weight, height and physical structure of the torso that can be found among the various users. Moreover, these same users can have different habits and preferences, even if they do have similar physical structures.

Finally, it is also worth considering the fact that bicycles are used both by male and female users, as well as by children, and also the fact that, sometimes, users have problems in the perineal-genital area (for example, consider the widespread problem of prostatic hypertrophy of male users, especially those of a certain age).

In particular, the rear part of the saddle quoted above, once placed in the conditions of actual use, is inclined forwards with respect to the horizontal and this prevents movements from being carried out on the saddle that some cyclists appreciate in the case of extra effort, sliding the torso backwards and forwards.

In other words, for some types of cyclist, the saddles according to the aforementioned documents, whilst being extremely effective and useful for most cyclists, are uncomfortable and "awkward" to use.

Other documents of the state of the art are: EP 2673183 A, EP 1778537 A and US 2007 210625 A.

The purpose of the present finding is to foresee a bicycle saddle that is structurally similar to those illustrated in the aforementioned documents, but that has special characteristics suitable for making it particularly suitable for a certain type of user, both due to their particular physical characteristics, and due to their particular usage habits of the bicycle.

This is obtained, according to the finding, by shaping the saddle according to the characteristics of the characterising part of claim 1.

The present finding will now be illustrated and described in detail, with reference to a particular embodiment thereof, given as a non-limiting example, with the help of the attached tables of drawings, where:

In this figure such elements are indicated with the following references:

a—anus
b-b—gluteal muscles
c—coccyx
d-d—ischiatic tuberosities
e—prostate
f-f—pudendal arteries
g—deep dorsal vein of the penis
h—deep dorsal artery of the penis
i-i—pubic arch
l—penis
m—testicles
n—body of the penis.

Figure 1:
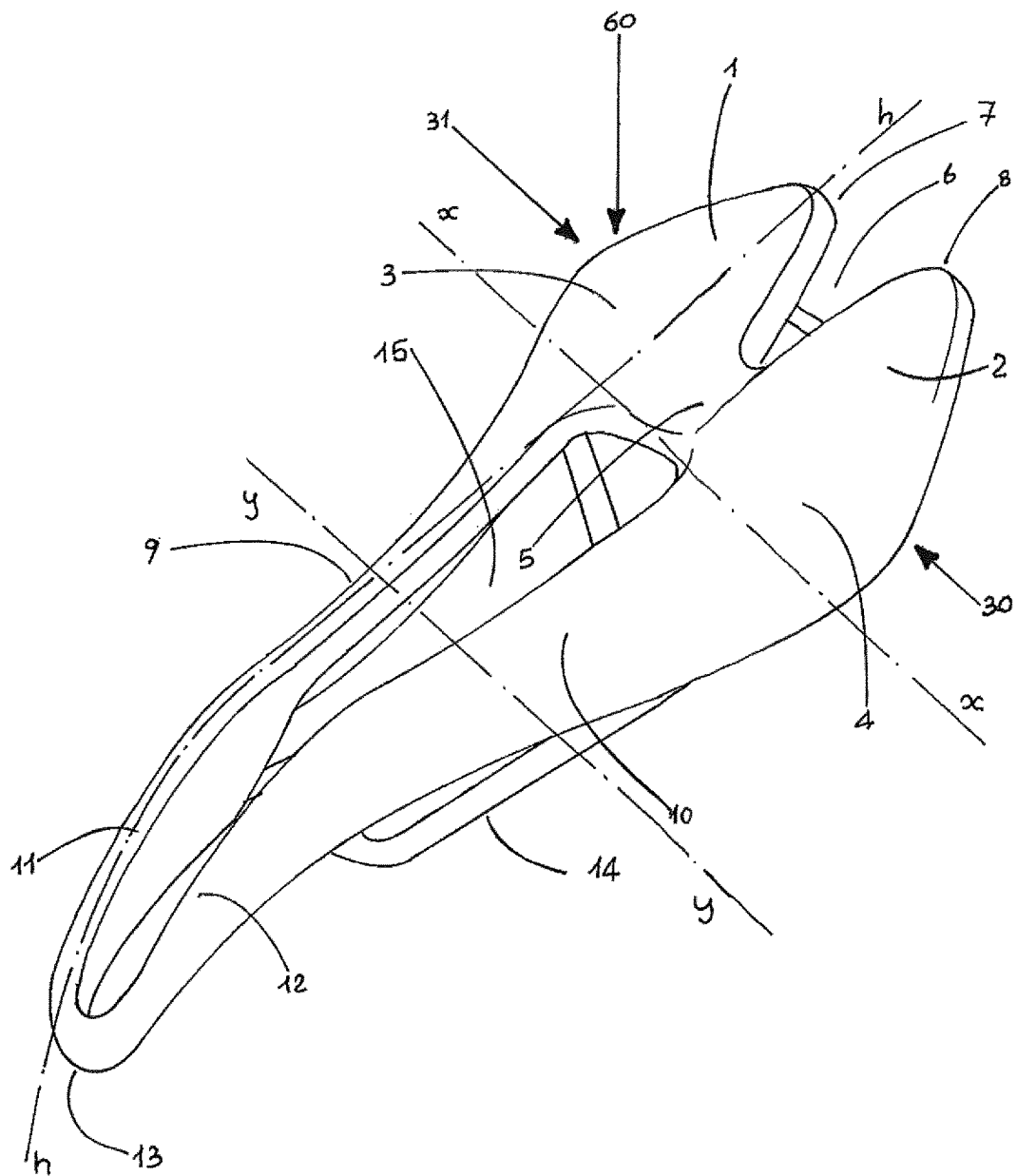
FIG. 1 (table I) illustrates a perspective view of the saddle according to the finding.

As can be seen in FIG. 1, the saddle 60 according to the finding longitudinally has two identical portions 30, 31 arranged symmetrically with respect to its longitudinal axis. At said longitudinal axis there is a channel 15 that is open from above to below, which separates said two portions from the intermediate part of the saddle up to the front part thereof. At the rear said channel has a greater width equal to about 30-35 mm, to then narrow and proceed with a constant width equal to about 10-20 mm, until it reaches the front end 13 of the saddle.

Figure 7:
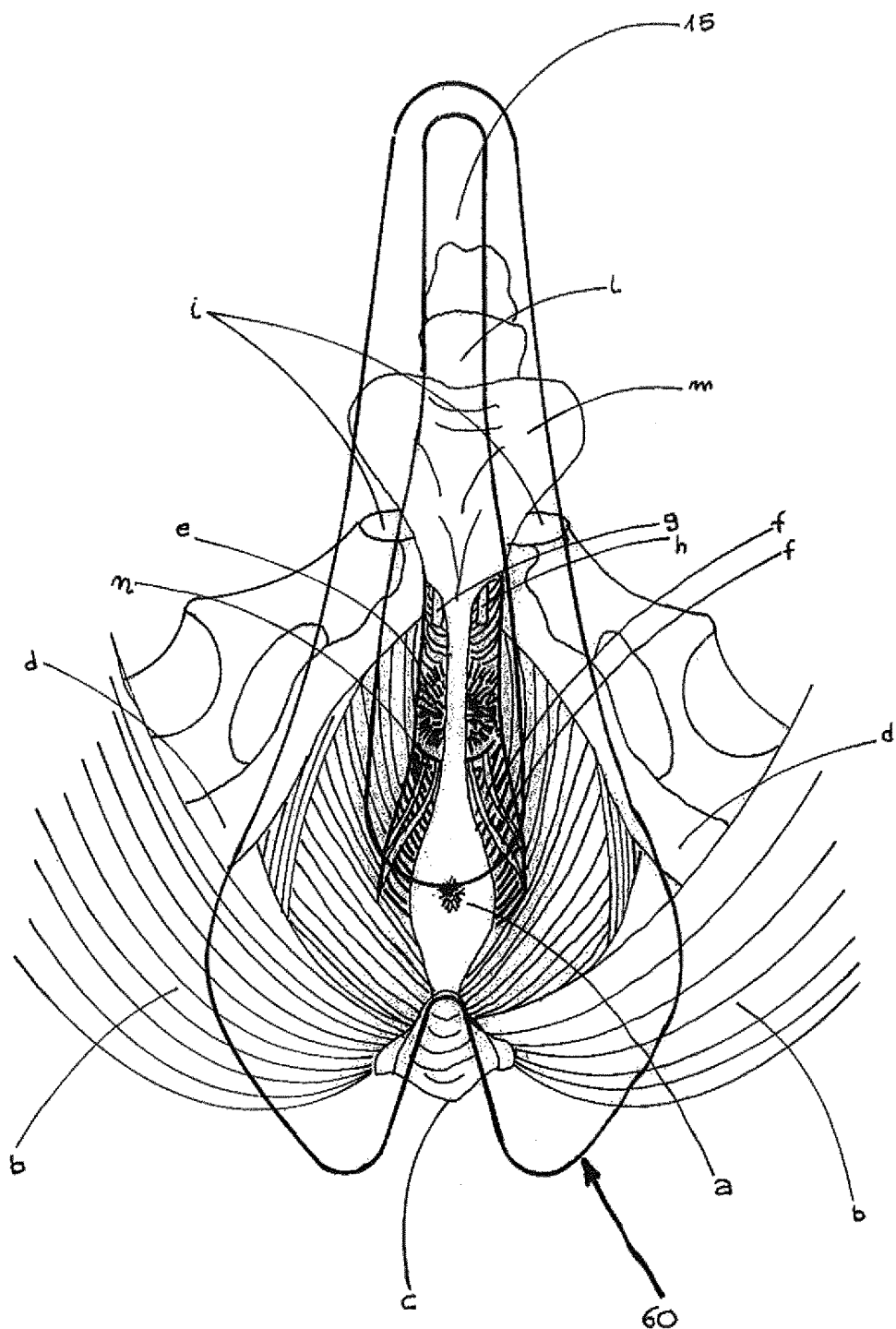
FIG. 7 (table VII) illustrates a dissected view of the structures of the perineal floor, of the ischiatic tuberosities and of the pubic arch arranged above the saddle.

Going back to the rear part, the two identical portions 30, 31 are separated from one another by a recess 6, defined at the side by two points 7, 8 that give the rear part of the saddle the dovetail shape. Said recess 6 proceeds towards the front part of the saddle with a depression 5, which ends right at the rear edge of the central channel 15. At the side of the recess 6 there are the areas 1, 2 where the gluteal muscles (ref. b-b of FIG. 7) are rested. These areas 1, 2 proceed at the front with the areas 3, 4 in which the ischiatic tuberosities (ref. d-d of FIG. 7) are rested. Going back to FIG. 1, it can be seen that the areas 3, 4 proceed with the extensions 9, 10 and then 11, 12.

At the line y-y (see also FIG. 5) the pubic arch (ref. i-i of FIG. 7) also rests on the saddle. In this position the extensions 9, 10 have a total length equal to about 40-50 mm and then start to go downwards with the extensions 11-12, with an inclination of about 30°-45°, gradually narrowing, until the end 13 is reached, which is substantially semi-circular shaped. The front part of the saddle, seen from the side, substantially takes up a bird's beak configuration.

Figure 3:
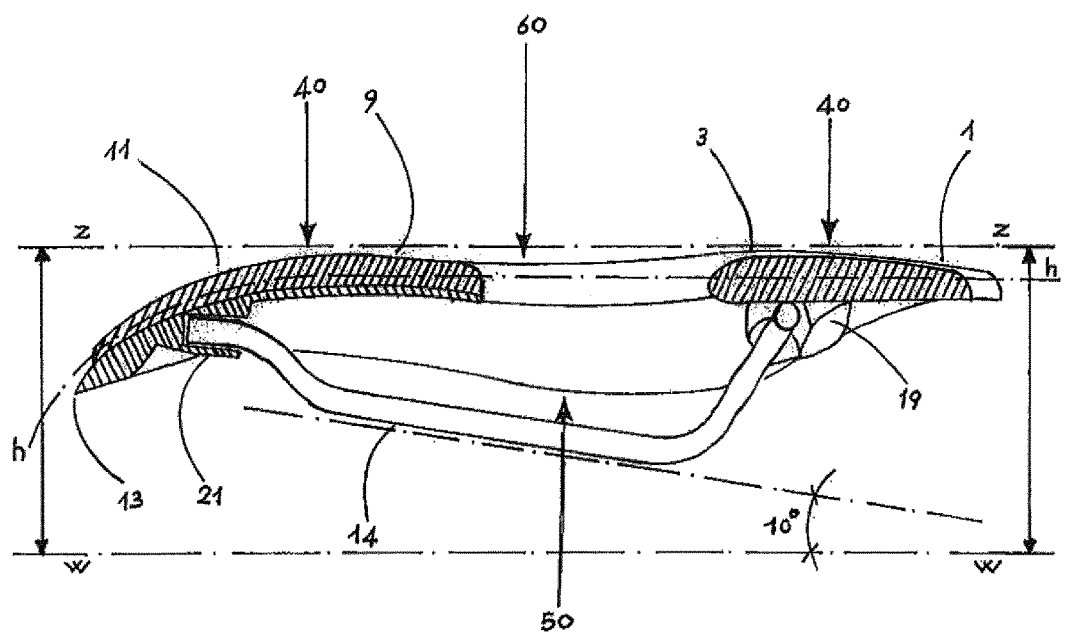
FIG. 3 (table III) illustrates a longitudinal middle section of the saddle according to the finding.

Observing FIG. 3 it can be seen that in the saddle according to the finding the upper surface of areas 1 and 2, where the gluteal muscles rest, is arranged substantially horizontally (line z-z) with respect to the ground (w-w) when the saddle is arranged in conditions of actual positioning on the bicycle. This allows the cyclist to move without any problem back and forth without modifying the pedalling position even during extreme rides. Moreover, this "horizontal" condition is more comfortable and practical with respect to the use of the saddles according to the aforementioned documents.

This applies in particular for cyclists who like to be able to move back and forth on the saddle during pedalling.

Again in FIG. 3 it can be seen that the support fork 14 of the saddle is fixed to the body 50 thereof with a portion 14' inclined by about 10° with respect to the ground (w-w).

Figure 2:
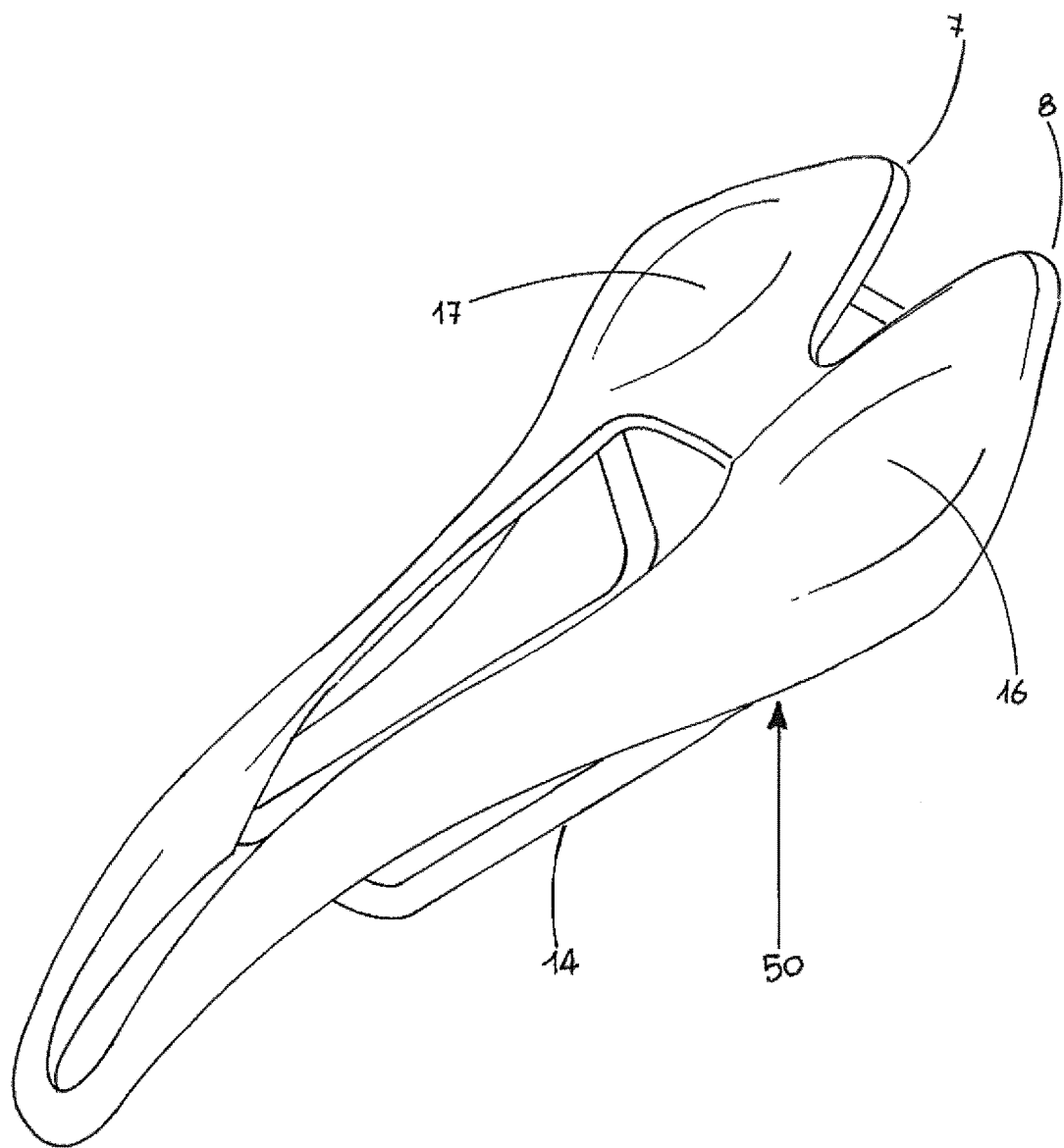
FIG. 2 (table II) illustrates a perspective view of the support body of the saddle according to the finding.
Figure 4:
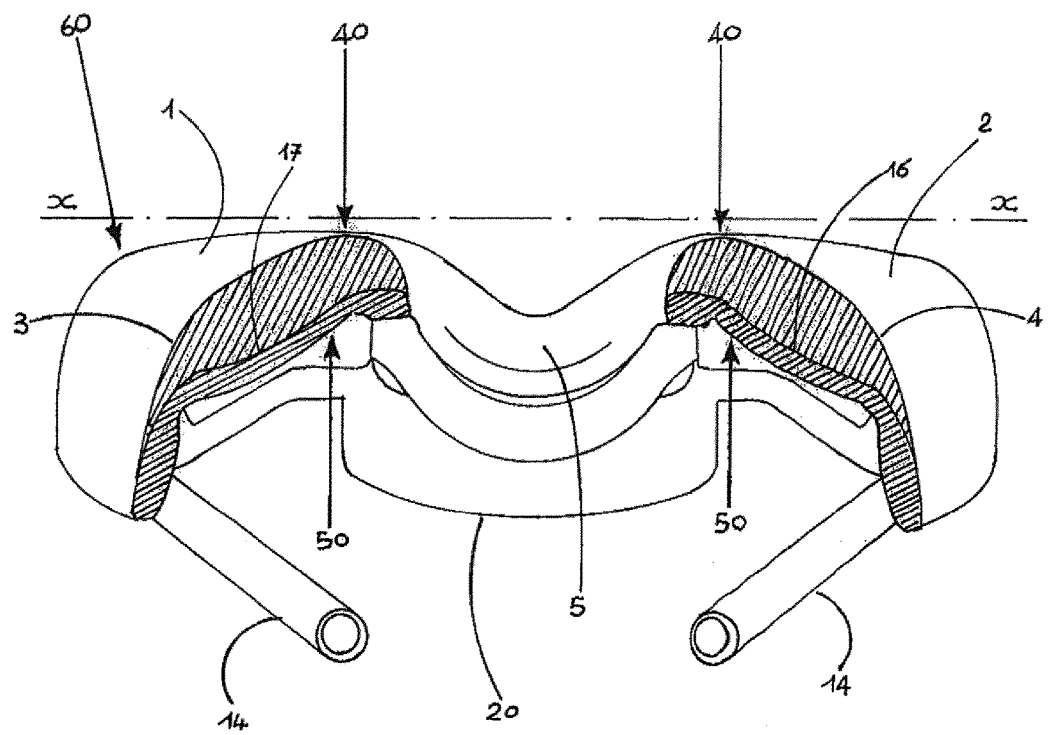
FIG. 4 (table IV) illustrates a cross section of the rear part of the saddle according to the finding, where the ischiatic tuberosities are rested.

In FIG. 4 it can be seen that, in a particular embodiment, it is possible to foresee for the ischiatic tuberosities to be supported at the areas 3, 4 through a padding 40 made, for example, from foamed polyurethane elastomer having a thickness equal to about 10-15 mm. However, it is possible to foresee for the saddle not to have such padding. In FIG. 2 it can be seen that on the bearing body 50, made from plastic material, beneath the visible portion of the saddle, there are two concavities 16-17, right at the aforementioned areas 3, 4, which have a concavity going upwards, to better aid the housing of the ends of the ischiatic tuberosities.

Figure 5:
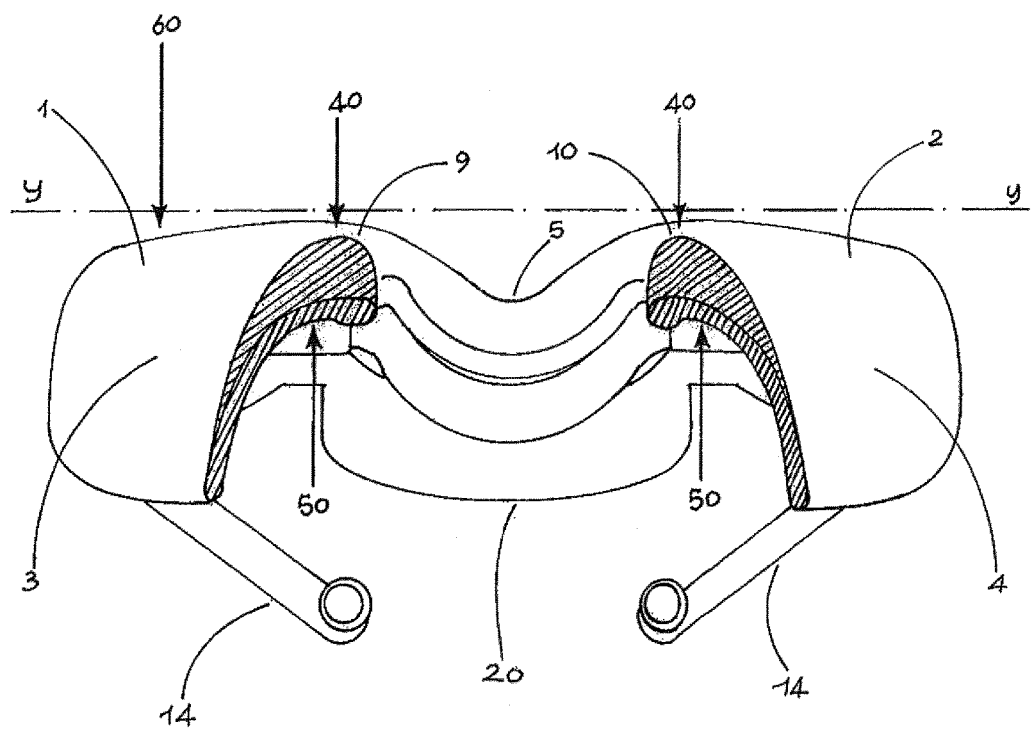
FIG. 5 (table V) illustrates a cross section of the middle portion of the saddle according to the finding, in particular of the area in which the pubic arch is rested.

Observing FIG. 5 it can be seen that also the pubic arch (i) is supported by a padding 40 made from foamed polyurethane elastomer of thickness equal to about 10-15 mm, which allows said pubic arch, under the weight of the torso of the human body, to not touch the underlying body 50, vice-versa consisting of rigid plastic material.

The presence of the padding 40 in the areas 3-4, as well as in the extensions 9-10 is important in the saddle according to the finding; indeed, due to the lack of the support, which should come from the body of the penis (n), from the prostate (e), as well as from the penis (1), which in the case of the saddle according to the finding are housed inside the channel 15, the padding 40 allows the ischiatic tuberosities and the pubic arch to support the weight of the torso of the human body without touching the underlying body 50 made from rigid plastic material, which would make the use of the saddle according to the finding extremely difficult and painful.

It should be noted that in bicycle saddles, in particular for racing bicycles, found on the market, which have the upper surface horizontal and which lack housing means for the structures of the perineum, the ischiatic tuberosities (and particularly the pubic arch) take advantage of the support of the prostate, of the body of the penis, as well as of the penis. Clearly, the aforementioned physiological elements undergo the squashing due to the presence of the weight of the torso of the human body (particularly the neuro-vascular structures). This in the long term causes serious problems for the uro-genital tracts, both in men and in women.

Figure 6:
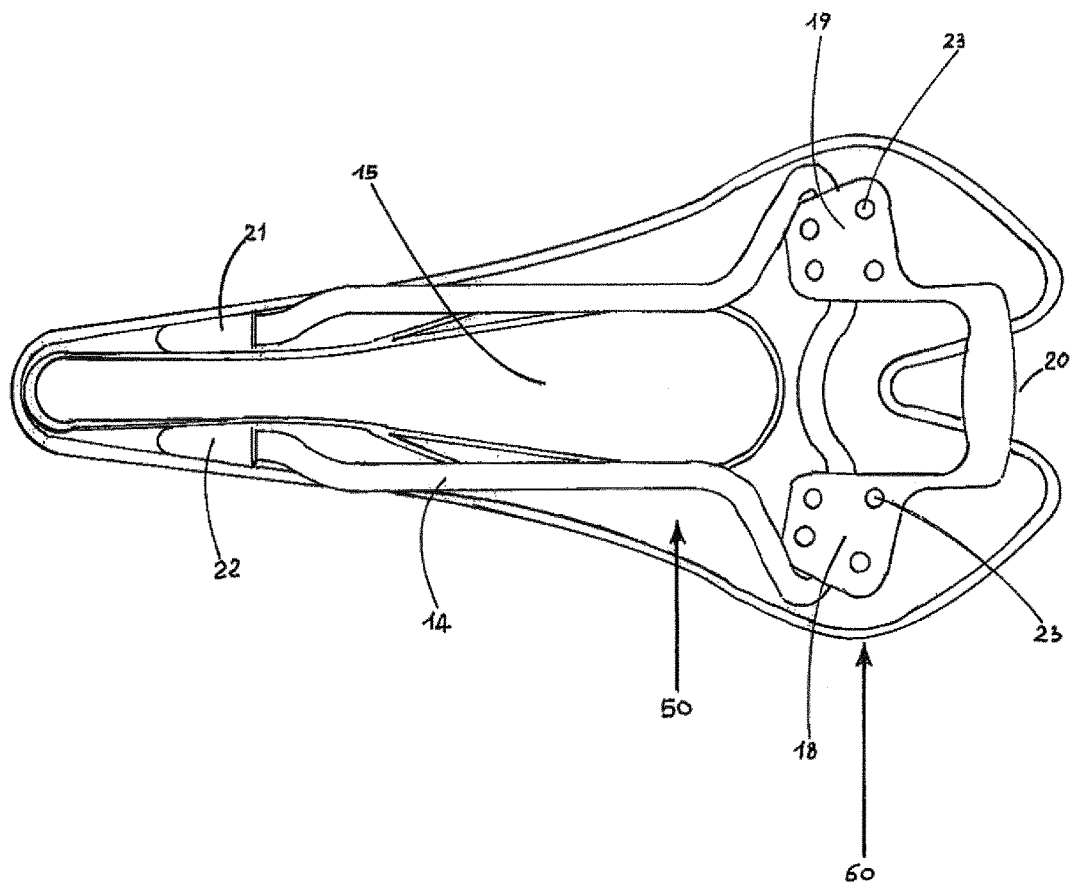
FIG. 6 (table VI) illustrates a plan view from below of the saddle according to the finding.

In FIG. 6 it is possible to see in particular the bearing body 50, the fork 14 where the clamp of the seat tube is fixed, the pre-made front pockets 21 and 22, inside which the ends of the fork 14 are slotted and, at the rear, the plates 18 and 19 fixed with four screws 23, each of which is above the fork, to keep it firmly fixed to the body 50.

Tests carried out have made it possible to establish that many users, both competitive and amateur, prefer to use the saddle according to the finding with respect to the saddles described in the aforementioned documents and this can be either due to their particular physical characteristics or due to their particular style of pedalling and sitting on the saddle.

Basically, with the saddle according to the present finding it is also possible for users who do not find the saddles described in the aforementioned patents to benefit from the clearly advantageous and innovative characteristics present in such saddles (mainly the central channel with its inclined front portion, the particular configuration of its intermediate part, the support fork, etc. . . . ), for the sole reason that, otherwise, they would feel forced to remain in a position that is too forced and they would have no way to be able to move easily back and forth.

The invention claimed is:

1. A bicycle saddle (60) comprising two identical portions (30, 31) arranged symmetrically about a longitudinal axis of said saddle, a channel (15) open from top to bottom separating said two identical portions and extending from an intermediate part of said saddle to a front end (13) of said saddle at said longitudinal axis, said channel (15) having a width at a rear part substantially greater than at a front part, a recess (6) arranged at a rear part of said saddle separating said two identical portions (30, 31) and having a dovetail shape defined by two lateral points (7, 8) on the rear part of said saddle, a depression (5) continuing from said recess (6) up to the rear part of said channel (15), laterally of said recess (6) are first areas (1, 2) intended to support the gluteal muscles of a user seated on said saddle, said first areas (1, 2) continue towards the front end (13) of said saddle with respective second areas (3, 4) intended to support the ischiatic tuberosities of said user, said second areas (3, 4) continue towards the front end (13) of said saddle with respective first extensions (9, 10) followed by respective second extensions (11, 12) which join together at the front end (13) of said saddle in a substantially circular shape and inclining downwardly in an aquiline shape at said front end (13), wherein said first areas (1, 2) intended to support the gluteal muscles of a user, said second areas (3, 4) intended to support the ischiatic tuberosities of a user, and said first extensions (9, 10) are substantially planar and disposed substantially parallel to the ground.

2. The bicycle saddle according to claim 1, wherein the upper surface of said saddle is devoid of padding.

3. The bicycle saddle according to claim 1, wherein said second areas (3, 4) are provided with a padding (40) on which a rider's ischiatic tuberosities are supported.

4. The bicycle saddle according to claim 3, wherein said saddle comprises a bearing body (50) including in the second areas (3, 4) of the two identical portions (30, 31) of the saddle respective upward facing concavities (16, 17) adapted to house the ends of the ischiatic tuberosities of a rider.

5. The bicycle saddle according to claim 1, which further includes a bearing body (50) an upper surface of which is covered with a padding (40), said bearing body (50) being supported at a bottom surface thereof by a support fork (14) adapted to be fixed to a seat post of a bicycle, wherein said bearing body (50) includes at the bottom surface two front pockets (21, 22) adapted to receive in a slotted fashion respective front ends of said support fork (14) and at the rear plates (18, 19) secured to the bearing body (50) by a series of screws (20) so as to fix the support fork (14) to the bearing body (50).

* * * * *